(12) United States Patent
Waughtal (10) Patent No.: US 11,361,322 B2
(45) Date of Patent: Jun. 14, 2022

(54) DYNAMIC POINT OF SALE ('POS') TRANSACTION PROCESSING FOR NETWORKED COMPUTING DEVICES

(71) Applicant: FESTIVAL CONTROL SYSTEMS PROCESSING, LLC, Austin, TX (US)

(72) Inventor: Jeff Waughtal, Austin, TX (US)

(73) Assignee: FESTIVAL CONTROL SYSTEMS PROCESSING, LLC, Austin, TX (US)

(*) Notice: Subject to any disclaimer, the term of this patent is extended or adjusted under 35 U.S.C. 154(b) by 15 days.

(21) Appl. No.: 17/117,391

(22) Filed: Dec. 10, 2020

(65) Prior Publication Data

US 2021/0365950 A1 Nov. 25, 2021

Related U.S. Application Data

(63) Continuation of application No. 16/258,698, filed on Jan. 28, 2019, now Pat. No. 10,896,425.

(51) Int. Cl.
*G06Q 20/40* (2012.01)
*G06Q 20/32* (2012.01)
*G06Q 20/20* (2012.01)

(52) U.S. Cl.
CPC ....... *G06Q 20/4093* (2013.01); *G06Q 20/204* (2013.01); *G06Q 20/3278* (2013.01); *G06Q 20/4033* (2013.01)

(58) Field of Classification Search
CPC .............. G06Q 20/4093; G06Q 20/204; G06Q 20/3278; G06Q 20/4033; G06Q 20/202
See application file for complete search history.

(56) References Cited

U.S. PATENT DOCUMENTS

| | | |
|---|---|---|
| 5,255,182 A | 10/1993 | Adams |
| 6,763,336 B1 | 7/2004 | Kolls |
| 7,349,871 B2 | 3/2008 | Labrou et al. |
| 7,364,070 B2* | 4/2008 | Chang .................. G07G 1/0081 705/26.1 |
| 7,774,402 B2 | 8/2010 | Singh et al. |
| 7,801,826 B2 | 9/2010 | Labrou et al. |
| 7,941,542 B2 | 5/2011 | Broda et al. |
| 8,548,859 B2 | 10/2013 | Matkovic |
| 8,561,884 B2* | 10/2013 | Jimenez Alamo ... G09B 21/006 235/375 |
| 8,768,838 B1 | 7/2014 | Hoffman |
| 9,558,503 B2 | 1/2017 | Oh et al. |

(Continued)

FOREIGN PATENT DOCUMENTS

CA 2001084779 A1 8/2001

Primary Examiner — Seung H Lee
(74) Attorney, Agent, or Firm — Bryan L. Baysinger; Nexsen Pruet, LLC (57) ABSTRACT

Disclosed are various embodiments for improvements in customer relationship management and point of sale payment processing at remote event spaces. The system, apparatuses, and methods disclosed herein facilitate the transaction processing of credit cards and other payment vehicles in often remote locations where network connections may be intermittent and suffer from frequent disconnects or interruptions of service. The embodiments disclosed operate to detect network events, dynamically adjust to the event space, and processes the transactions on demand. The apparatuses are equipped to facilitate the event environment and are adapted to execute instructions to facilitate the financial transactions.

17 Claims, 8 Drawing Sheets

(56) References Cited

U.S. PATENT DOCUMENTS

| | | |
|---|---|---|
| 10,607,203 B2 | 3/2020 | Golberg |
| 10,990,980 B1 * | 4/2021 | Reses .................. G06Q 40/025 |
| 2002/0152124 A1 | 10/2002 | Guzman et al. |
| 2004/0128256 A1 | 7/2004 | Krouse et al. |
| 2005/0086286 A1 | 4/2005 | Gatto et al. |
| 2005/0086360 A1 | 4/2005 | Mamou et al. |
| 2007/0188749 A1 | 8/2007 | Brady et al. |
| 2007/0233603 A1 | 10/2007 | Schmidgall et al. |
| 2008/0051059 A1 | 2/2008 | Fisher |
| 2008/0147495 A1 * | 6/2008 | Bal .................... G06Q 30/0241 |
| | | 705/14.4 |
| 2008/0270301 A1 | 10/2008 | Jones et al. |
| 2010/0051689 A1 | 3/2010 | Diamond |
| 2011/0276636 A1 | 11/2011 | Cheng et al. |
| 2013/0263008 A1 | 10/2013 | Bylahalli et al. |
| 2013/0317928 A1 | 11/2013 | Laracey |
| 2015/0120666 A1 | 4/2015 | Otsuka |
| 2016/0086161 A1 | 3/2016 | Zhou et al. |
| 2016/0321661 A1 | 11/2016 | Hammond et al. |

\* cited by examiner

DYNAMIC POINT OF SALE ('POS') TRANSACTION PROCESSING FOR NETWORKED COMPUTING DEVICES

CROSS-REFERENCE TO RELATED APPLICATION

The foregoing application is a continuation of and claims the benefit and priority of U.S. patent application Ser. No. 16/258,698, filed on Jan. 28, 2019, titled "DEDICATED POINT OF SALE OVER AN INTERMITTENT NETWORK," the contents of which is herein incorporated by reference in its entirety.

FIELD

The invention relates generally to advancements in network communications and payment processing for point of sale transactions. The invention further includes technologies in advanced mobile computing, networking, customer relationship management, enterprise resource planning, and payment processing.

BACKGROUND

Point of sale ('POS') devices and systems are becoming increasingly popular. As traditional stores have evolved to take shape, so too have payment processing methods. These methods require POS devices to be equipped to handle the rigors of many different environments, including store fronts, outdoor stores, stores where inclement weather is possible, and mobile stores. As such POS devices must be equipped to handle a variety of scenarios and resistant to environmental damage.

Additionally, as POS devices and systems have evolved, so has the manners of payment. The EMV chip card is one such advancement. The EMV chip card now allows for a more secure transaction by embedding a microprocessor into the credit card. Such advancements require new POS systems to come equipped with the technology capable of processing such transactions across distributed networks.

Like POS devices and manners in payment, network communications continue to evolve and bring new advancements in data communications that were previously unavailable. The new data communication technologies have opened the door for entirely new POS systems and platforms to take place. These new systems are capable of delivering verification and transaction services to remote areas that were previously not possible. However, issues around network connectivity and intermittency are a persistent point of weakness.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components and apparatuses is provided, followed by a discussion of the methods and operation of the same. Example systems and methods for Customer Relationship Management ('CRM') and Point of Sale ('POS') merchandising implemented in a computer system are described with reference to the accompanying drawings, beginning with FIG. 1.

Figure 1:
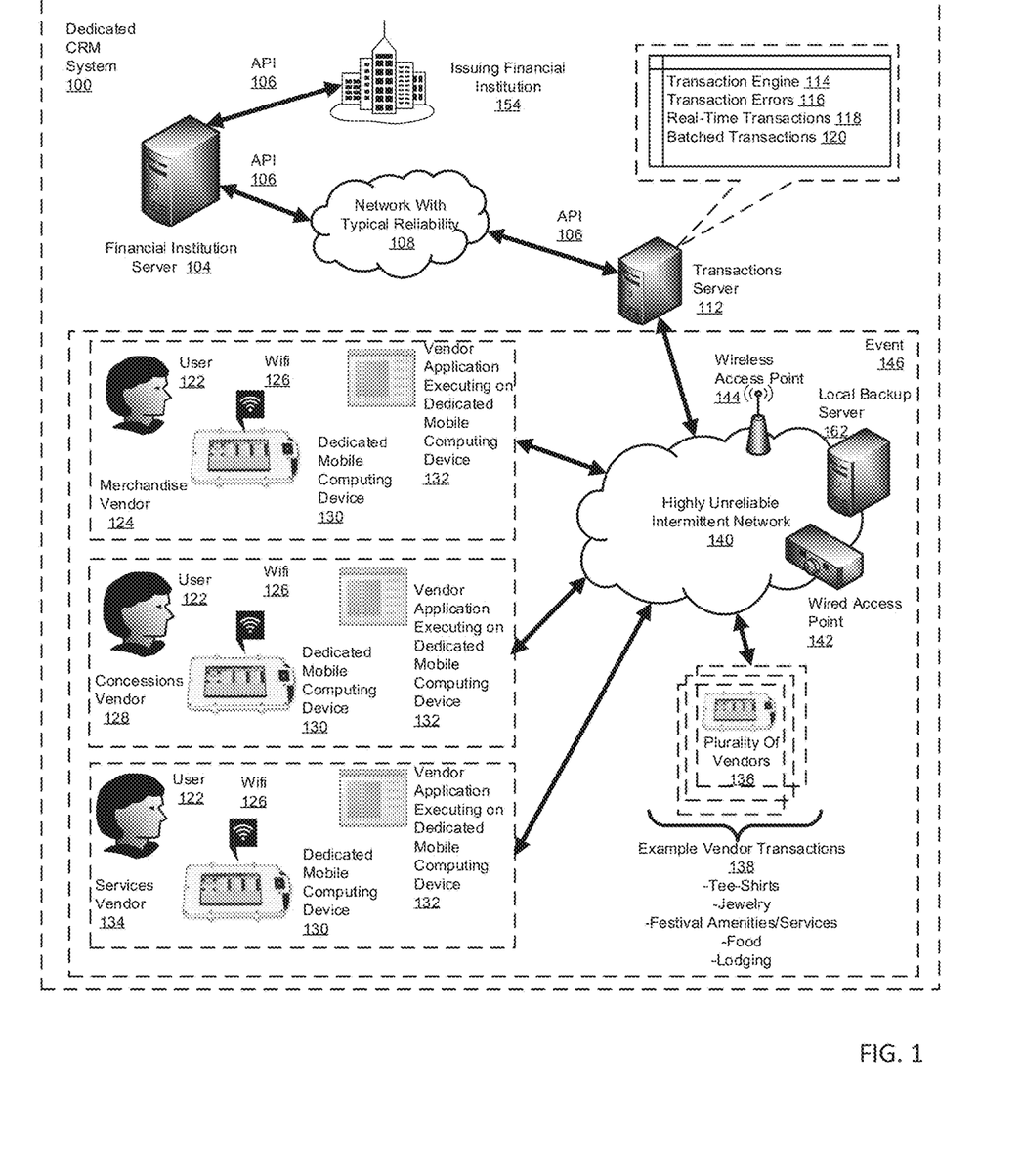
FIG. 1 sets forth a network diagram illustrating an example system for Customer Relationship Management ('CRM') according to embodiments of the present invention.

FIG. 1 sets forth a network diagram illustrating an example system for CRM according to example embodiments of the present invention. CRM is an approach to manage a company's interaction with current and potential customers. CRM often uses data analysis about customers' history with a company to improve business relationships with customers. CRM often deals with driving sales growth and revenue, modern CRM is based on computer applications, systems and suites of software and hardware. POS is defined as the time and place when a sale takes place. POS systems are often subsets of a CRM platform or model. POS systems include activities such as calculating the amount owed, the customer that owes the amount, preparing an invoice, receiving and processing payment, verifying accounts, and many other seller merchandising features. Both CRM and POS fall within Enterprise Resource Planning ('ERP') and both CRM and POS facilitate actions for ERP.

The dedicated CRM system (100) of FIG. 1 is framed in an event (146) environment. Event (146) environments, according to example embodiments of the present disclosure, include festivals, concerts, music events, remote events, stand-alone store fronts, merchant carts, temporary merchant shops, permanent merchant shops, and other types of events wherein payment processing is utilized.

In the example embodiment of FIG. 1, a user (122) is a vendor, in the example of FIG. 1 a merchandise vendor (124), a concessions vendor (128), and a services vendor (134), along with a host of example vendor transactions (138) as is described herein FIG. 1. Additional vendors include retail vendors, e-commerce vendors, payment exchange vendors, and many others as will be apparent to those of skill in the art are disclosed herein.

In the example embodiment of FIG. 1 the merchandise vendor (124) is equipped with a dedicated mobile computing device (130). Further explanation of an example embodiment of a dedicated mobile computing device (130) is found in FIG. 8 and shall be discussed even further later in the application. The dedicated mobile computing device (130) having network communications through WiFi® (126) and connecting over a highly unreliable intermittent network (140). In the example embodiment the dedicated mobile computing device (130) is configured to execute a payment processing vendor application (132). The payment processing application (132) configured with the vendor's goods and services such as the examples described in vendor transactions (138).

In the example embodiment of FIG. 1, the vendor application executing on the dedicated mobile computing device (132) is configured for each vendor, such as a merchandising vendor (124), a concessions vendor (128), and a services vendor (134) to display through a graphical user interface ('GUI') a vendor storefront with deployable items and services. In the example embodiment the application is connected with WiFi® (126) to highly unreliable intermittent network (140) for communication with a transactions server (112).

An application executing on a dedicated mobile computing device (132) in the example embodiment is a store front GUI for the vendor to processes a sale. The application is dynamic and receives updates from the transaction server (112) for customization of products and services. Customization of products and services includes adding new buttons for goods or services for sale or adding new functionality such as tax variance, many other features are embodied herein as will be apparent to those of skill in the art. The application also further receives from the transaction server (112) information on whether or not the transaction is processed. Further discussion of the example embodiment of the application is discussed in the calling sequence of FIG. 3 and will be discussed further later in the application.

In the example embodiment of FIG. 1, the highly unreliable intermittent network (140) is a network that is configured with multiple wireless access points (144) and wired access points (142) to set up a network at an event (146) so that the plurality of vendors (136) utilizing the dedicated mobile computing devices (130) can exchange information with one another and the transactions server (112). In the example embodiment the highly unreliable intermittent network (140) is a network that suffers from a spectrum of brief or sometimes lengthy delays in network traffic or communication. This network intermittency may occur due to load balancing, network latency, wireless network distance and signal strength, power issues, or any number of issues known to cause network failure in both software and hardware.

In the example embodiment of FIG. 1, the local backup server (162) is a local server that maintains connection over the wireless access point (144) or wired access point (142) to backup and store the contents of the dedicated mobile computing devices (130). The local backup server (162) is also configured to hold a blacklist or other contents that may be accessed and distributed at the event (146) location and is equipped to have access to the devices at a local access point. The local backup server is also equipped to communicate over the highly unreliable intermittent network (140) to the transactions server (112) to restore any lost transmission data from the dedicated mobile computing devices (130).

The transaction server (112), in the example embodiment of FIG. 1, is a server that can be customized to run applications and store data for the dedicated CRM system (100) to function. The transactions server (112) updates the dedicated mobile computing devices (13), each executing the vendor application (132) in reliance on the goods and services each of the plurality of vendors (138) sells.

In the example embodiment the transaction server (112) is equipped to push information through the highly unreliable intermittent network (140) to each of the dedicated mobile computing devices (130). The network communications operate in a first-in first-out order, additional network communication patterns and orders are disclosed herein and are selected to create optimal transfer of information from the transactions server (112) to the plurality of dedicated mobile computing devices (130), along with the financial institution server (104).

In the example embodiment of FIG. 1, the transaction server (112) is a server that a dedicated payment processing organization functions as to check and verify credit with the cardholders issuing financial institution (154). Additionally, the transaction server is equipped to communicate storefront updates to the plurality of vendors (138). In the example embodiment the transactions server (112) further runs a web application for rapid deployment to vendors and allows for vendors to update storefronts with goods and services through an application programming interface ('API') web application deployed on the dedicated mobile computing devices (130). Additional web applications are disclosed herein and serve as only several of many example embodiments of the current invention. The transaction server (112), in the example embodiment of FIG. 1, serves to communicate information interchangeably across the highly unreliable intermittent network (140) as well as the network with typical reliability (108).

The transaction server (112), in the example embodiment of FIG. 1, possesses a transaction engine (114). The transaction engine (114) is a programming engine implemented on a computing system that executes and processes the real-time transactions (118) and the batched transactions (120). In the example embodiment the real-time transactions (118) are transactions that have been received from the vendor application (132) executing on the dedicated mobile computing device (130), wherein the transaction server (112) executing the transaction engine (114) communicates through the API (106) or other network interface layer through the network with typical reliability (108) to the financial institution server (104). The financial institution server (104) then communicates to the issuing financial institution (154) for the holder of the payment vehicle. In the example embodiment, payment vehicles as the term is used includes credit cards, check cards, RFID, e-Cards, chip credit cards, and other credit vehicles that will be known to those of skill in the art.

In the example embodiment of FIG. 1, the transactions server (112), equipped with the transaction engine (114), also records transaction errors (116). Transaction errors (116) includes errors that relate to the processing of the financial transaction. Errors of this nature can occur at the financial institution (104) by means of declining credit, at the issuing financial institution (154) by means of the card holder's institution declining credit, and also through the network with typical reliability (108) having difficulty or congestion in transmitting the transaction. Additional transaction errors (116) include system errors due to system or software malfunction as well as errors associated with decline of service, many other errors may be recorded and will be apparent to those of skill in the art.

The transaction engine (114) according to FIG. 1 processes the real-time transactions (118) and the batched transactions (120) that are pushed to the transactions server (112) from the dedicated mobile computing device (130). In the example embodiment the queue of transactions from the dedicated mobile computing devices (130) resides on the transaction server (112) and is processed by the transaction engine (114). Additional embodiments include the queue of transactions residing on the dedicated mobile computing devices (130), and wherein the dedicated mobile computing devices communicate directly with the financial institution server (104) across both a highly unreliable intermittent network (140) and a network with typical reliability (108).

In the example embodiment of FIG. 1, the transactions server (112) processes the que of batched transactions (120) that were batched on the dedicated mobile computing devices (130) when network intermittency occurred. The processes of hatching payment and processing the transactions in a batched mode are disclosed further in the application in FIG. 3.

Issuing financial institutions (154) are financial institutions that give credit through the various payment vehicles as disclosed in FIG. 1. Typical financial issuing institutions include Bank of America®, Wells Fargo®, Chase®, and many other institutions that provide credit or other financial backing for payment vehicle holders. These financial institutions provide an array of financial services and also connect through a network of payment processors at a central hub, depicted in the example embodiment as the financial institution server (104). The financial institution server (104) operates on a first-in first-out methodology as network processing occurs and the various requests or transactions are incoming and outbound. Various other network communications are applicable here and can be utilized in such a fashion to increase network and system performance.

The dedicated CRM system (100) of FIG. 1 is just one embodiment of the disclosure, further embodiments for FIG. 1 include a dedicated POS system as it relates to the present disclosure. The dedicated CRM system (100), according to the example embodiment of FIG. 1 operates at an event (146) to processes financial transactions along with updating vendor POS storefronts through dedicated mobile computing devices over a highly unreliable intermittent network (140) to a transaction server (112) that enables communication with a financial institution server (104) to verify the credit of a cardholder at the issuing financial institution (154). The flow of information and communication is bi-directional along the entire system and is equipped to operate in a varying of conditions and events (146).

Figure 2:
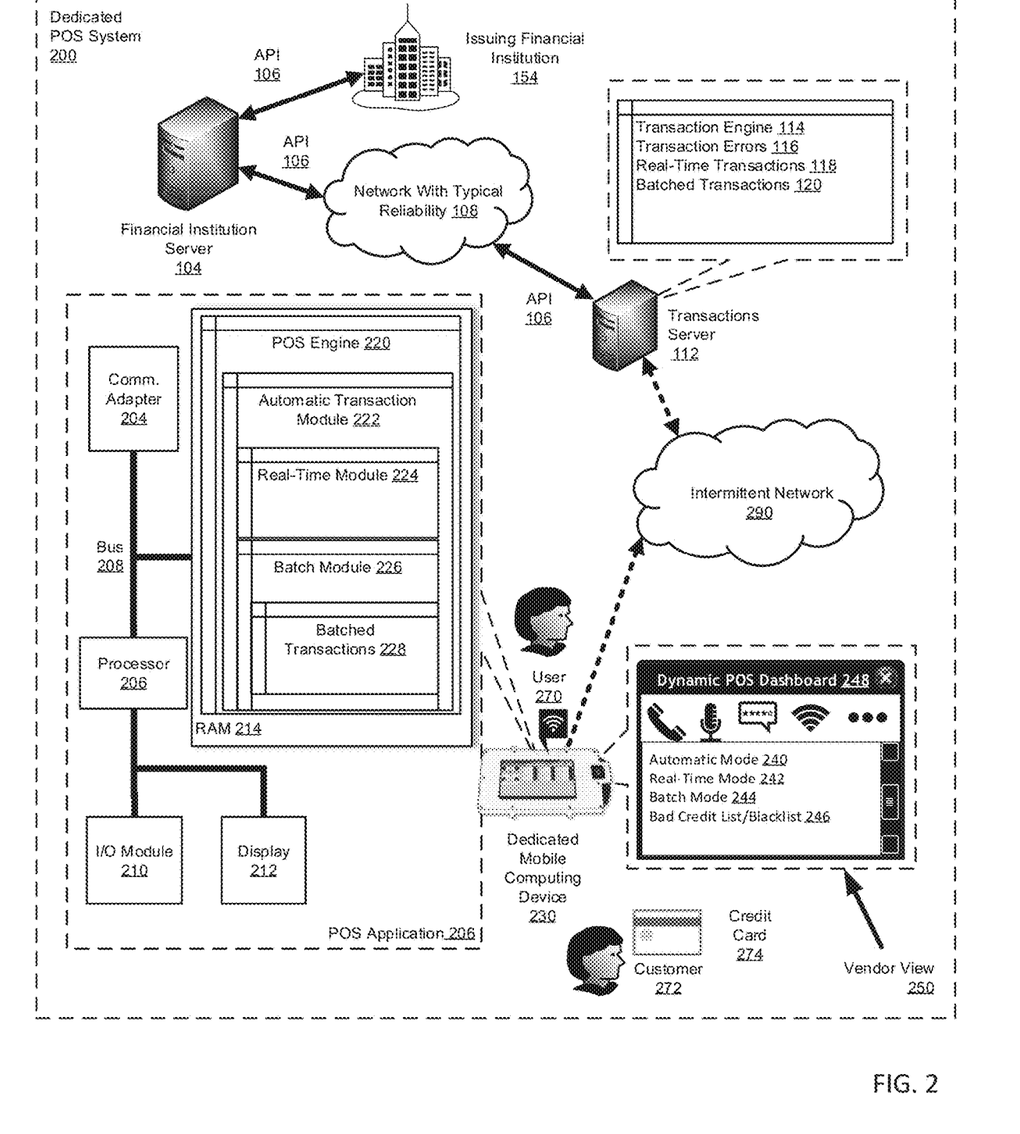
FIG. 2 sets forth a network diagram illustrating an example system for Point of Sale ('POS') according to embodiments of the present invention.

For further explanation of the systems, apparatuses, and methods disclosed herein, FIG. 2 sets forth a network diagram depicting a dedicated POS system (200) as an example embodiment as it relates to the present disclosure. The dedicated POS system (200) of FIG. 2 has a dedicated mobile computing device (230). The dedicated mobile computing device (230) is equipped to processes and execute instructions for computing programs in non-transitory memory. Typical instructions include assembly language as well as equipped with an Operating System ('OS') such as Windows®, Android®, iOS®, UNIX®, or other mobile OS that would enable software applications to execute in memory. The Dedicated mobile computing device (130) executing instructions on a processor (206) and communicating those instructions via a bus (208) to a series of components, including but not limited to, a communications adapter (204), an input and output module (210), a display (212), and random-access memory (214) in which program instructions may be held. The POS engine, in the example embodiment of FIG. 2, is stored in memory (214) and executed by the processor (206).

The POS engine, in the example embodiment of FIG. 2, is an engine that operates to select and process a financial transaction based on a multiplicity of factors. The POS engine checks to see if the dedicated mobile computing device (230) is connected or not connected to the intermittent network (290). The POS engine (220) is equipped with an automatic transaction module (222), the automatic transaction module (222) is equipped to processes transactions in real-time mode (224) or batch mode (226) as the POS engine indicates the status of the network connection or the availability of service. The real-time module (224) performs as a subset of the automatic transaction module (222), and is equipped to processes transactions in real-time as the POS engine indicates successful network connection and operational equipment. In the example embodiment, when presented with a financial vehicle, such as a credit card (274), the dedicated mobile computing device (230) initiates the POS engine (220) wherein the automatic transaction module (222), if selected, initiates the real-time module (224). The automatic transaction module (222) verifies network connectivity and if a network connection exists attempts execution of the real-time module (224). The real-time module attempts communication across the intermittent network (290) to the transaction server (112) and awaits a response. In the example embodiment, if no response is received or a network connection error occurs the POS engine indicates to the automatic module (222) and the batch module (226) batches the transaction (228) until network connection is restored. The batches transactions (228) upon the POS engine (220) and the automatic transaction module (222) signifying network connection is restored begins the batch module (226) wherein the transaction is sent over the intermittent network (290) to the transactions server (112). The previous scenarios is but one embodiment of the invention disclosed herein, further disclosure and embodiments are depicted below and will be of use in understanding the systems, apparatuses, and methods disclosed herein.

The dedicated mobile computing device of FIG. 2 contains a dynamic POS dashboard (248) as an example embodiment of the disclosure. The dynamic POS dashboard (248) is a storefront for the user (270) or vendor to configure settings such as automatic mode (240), wherein automatic mode (240) enables the automatic transaction module (222) within the POS engine (220). The POS dashboard is also equipped with additional features such as messaging, VOIP calling, a speaker for use with a smart assistant, battery indicator, WiFi® signal strength, Bluetooth® signal strength and an entire host of additional dashboard features for facilitating a transaction at an event. In the example embodiment, the dynamic POS dashboard (248) is the front-end application GUI layer, while the POS engine and POS application (206) form the back-end of the software suite. The POS application (206) accepting payment vehicles through the dedicated mobile computing device (230) as the dynamic POS dashboard (248) is configured to keep the user (270) as well as the customer (272) informed of transactions and other processing items.

The dynamic POS dashboard, according to the example embodiment in FIG. 2, is configured with automatic mode (240). Automatic mode (240) is an event driven mode that is based on numerous parameters including WiFi® communications and network communications. In the example embodiment automatic mode (240) switches between real-time mode (242) and batch mode (244) based upon the previous parameters. Real-time mode (242) attempts the transaction in real-time when communication is available across the intermittent network (290) and the transactions server (112). When such communications are received by the transactions server (112) the network with typical reliability (108) is utilized to communicate with the financial institution server (104), wherein the financial institution server connects through a network to the various credit issuing institutions (154) for a response on whether credit is available.

The dynamic POS dashboard (248) maintains a bad credit list, otherwise known as a blacklist (246), residing on the storage of the dedicated mobile computing device (230) according to the example embodiment of FIG. 2. The blacklist (246) is a repository that is synchronously communicated over WiFi®, Bluetooth®, Beacons, or other networking technology to the plurality of dedicated mobile computing devices (230) at the event. The blacklist (246), in the example embodiment, is a storage ledger of credit accounts that have unusual activity. In the present embodiment, unusual activity is described as high swipe activity, high charge activity, or activity that would be deemed unusual in a financial credit processing scenario. Credit abusers are known to utilize methods of charging credit when they have reason to believe that the credit is being batched and not instantaneously reconciled with the financial institution. The blacklist (246) in the example embodiment seeks to remedy batched transaction abuse by creating a local network-based authenticity check. The local network capable of operating with the plurality of dedicated mobile computing devices (230) equipped in the field at the given event, where each device maintains the same synched copy as to prevent fraud at any one given dedicated mobile computing device. Additional features of the blacklist (246) repository include the POS engine (220) executing program instructions on the list in the form of filters and alerts, as well as creating a denial of credit alert and prompt on the dynamic POS dashboard (248).

The transaction server (112) of the example embodiment of FIG. 2, includes the transaction engine (114), transaction errors (116), real-time transactions (118), and batched transactions (120). The transaction errors are errors as described in the previous embodiment wherein an error is a malfunction in the network, hardware, or software. Real-time transactions are transactions that are processed in real-time from the automatic transaction module (222) selecting the real-time module (224) within the POS engine (220) and attempting the real-time credit transaction. Batched transactions (120) are transactions established by the POS engine (220) in automatic transaction module (222) selecting the batch module (226) and pushing the batched transactions (228) to the transaction server (112) upon successful communication on the network.

Figure 3:
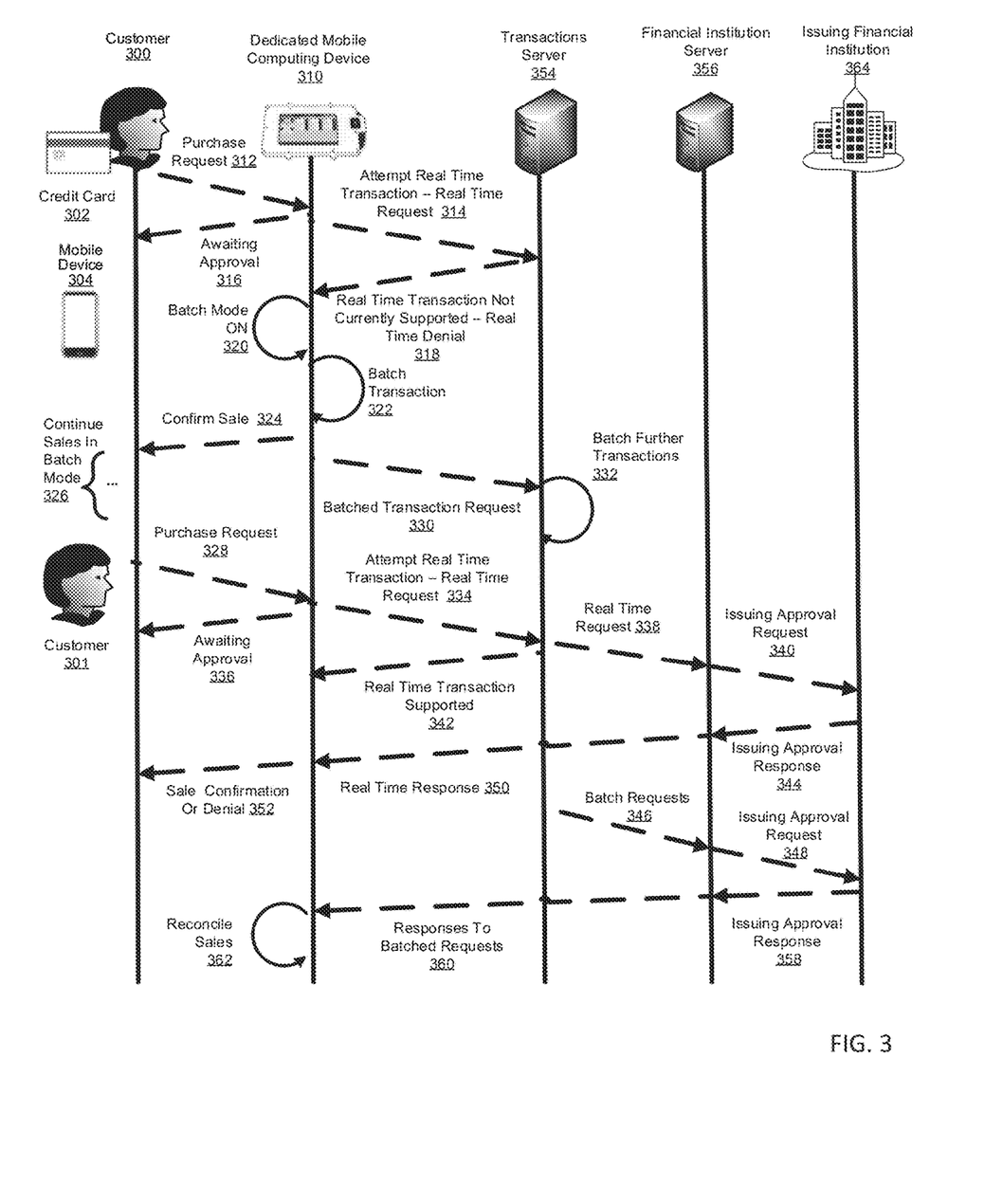
FIG. 3 sets forth a calling sequence illustrating an example calling order for a CRM and POS system according to embodiments of the present invention.

For further explanation of the systems, apparatuses, and methods herein, FIG. 3 sets forth a calling sequence diagram as an example embodiment of a transaction occurring in the CRM and POS system. The customer (300) utilizes a credit card (302) to complete a purchase of goods or services with a purchase request (312) according to the example embodiments of FIG. 3. The purchase request (312) is conducted by utilizing the dedicated mobile computing device (310) that is held by the vendor at the event. The customer (300) begins awaiting for approval (316), and in the case of mobile payment through near field communication or radio frequency ID, the customer (300) awaits acknowledgement of the completed transaction on a mobile device (304). The dedicated mobile computing device (310), upon receiving a purchase request (312) attempts a real-time transaction by a real time credit request (314) to the transactions server (354). If a denial occurs by the dedicated mobile computing device (310) to the transactions server (354), a real time transaction not currently supported and a message of denial is transmitted (318). The dedicated mobile computing device (310) enters batch mode (320) and batches the transaction (322) locally on the dedicated mobile computing device. Once the transaction is batched and the check passed the bad credit list, the sale confirmation (324) is transmitted to the customer (300). The dedicated mobile computing device (310) continues to perform functions in batch mode while real-time transactions are not supported at the transaction server (326). Upon successful connection to the transaction server (354), the batched transaction requests (330) are pushed to the server wherein transaction server batches the transactions for eventual processing and clearing at the financial institution server (356). The above calling sequence is but one example embodiment of the dedicated CRM and POS system making sequence calls to the various entities. Additional example embodiments will follow and derivatives on the sequence as well as events will be apparent to those of skill in the art.

In another example embodiment of FIG. 3, the customer (301) submits a purchase request (328) to the dedicated mobile computing device (310). The dedicated mobile computing device (310) attempts a real time transaction request (334) to the transactions server (354). If the transactions server receives the request without error, it attempts a real-time request (338) to the financial institution server (356). The financial institution server (356) attempts a request to the issuing approval request (340) to the cardholders issuing financial institution (364). In the interim, the transactions server (354) communicates to the dedicated mobile computing device (310) that a real-time transaction is supported (342) and to await completion or error. The issuing financial institution (364) issues an approval response (344) or alternatively a denial of credit response, or an error in attempting to check the credit to the financial institution server (356). In the case of an approval from the issuing financial institution, the approval is transmitted to the financial institution server (356) to the transaction server (354), wherein the real-time response (350) is sent to the dedicated mobile computing device servicing the cardholder (350) and the customer (301) receives a confirmation of sale or a denial of sale response (352).

According to the example embodiments of FIG. 3, the batched transactions (322) and any further batched transactions (332) are sent as batch requests (346) to the financial institution server (356). The financial institution server (356) requests a issuing approval request (348) for each account with the issuing financial institution (364). The issuing financial institution (364) transmits the issuing approval response (358) to the financial institution server (356) where the financial institution server (356) transmits the issuing approval response (358) to the transactions server (354), where the transactions server (354) transmits the responses to the bathed requests (360) to the dedicated mobile computing device (310) wherein the device reconciles sales (362). The disclosure herein is but one example of many scenarios of a calling sequence under the present disclosure. The example embodiment is in no way limited to the previous series of calling steps, in fact many of the steps may be performed out of order or within different contexts, such as all transactions may be set to hatch mode only and no real-time requests allowed. Additionally, the opposite is the same with real-time mode.

Figure 4:
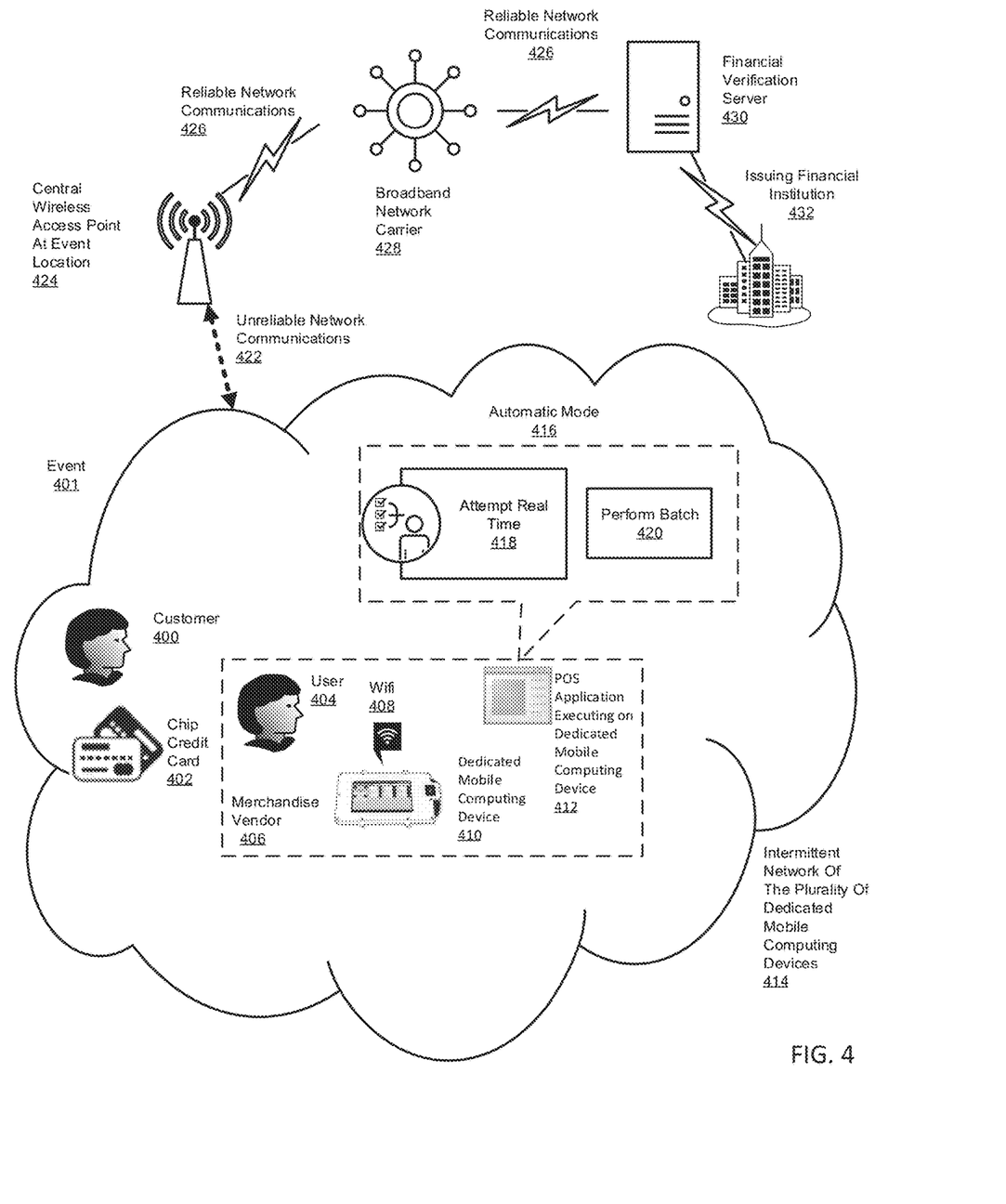
FIG. 4 sets forth a network diagram illustrating an example embodiment of the POS system according to embodiments of the present invention.

For further explanation of the systems, apparatuses, and methods disclosed herein we focus our attention on the example embodiment disclosed in FIG. 4. FIG. 4 sets forth a network diagram as an example embodiment of the present invention. The event (401) as previously disclosed is often a remote location such as a music festival or sporting event. Other events (401) that are not considered remote are also disclosed, such as retail shops and sporting venues. This list is by no means encompassing and additional events or locations are disclosed herein. In the example embodiment of FIG. 4, the event (401) contains a plurality of dedicated mobile computing devices (410), wherein the devices are equipped with WiFi®, Bluetooth® and sometimes LAN network cards. The dedicated mobile computing devices (410) are connected over the intermittent network (414). The network can comprise just one device, but often times many devices are deployed at an event (401) so to facilitate POS transactions at many different vendors. In the example embodiment we see one such vendor, a merchandise vendor (406), where the user (404) is the vendor operator utilizing the dedicated mobile computing device (410). The user (404) accepts a chip credit card (402) from a customer (400) for merchandise. The user processes the chip credit card (402) via the chip reader on the dedicated mobile computing device (410). The chip reader is acknowledged by the POS application (412) and if in automatic mode (416) attempts a real time transaction (418). If the real time transaction fails on the network through the unreliable network communications (422) to the central wireless access point at the event (424), the POS application (412) will enter batch mode and perform a batch transaction (420). The batched transaction will then be communicated via the POS application on the screen of the dedicated mobile computing device, where the user (404) will confirm or deny the sale to the customer (400).

The central wireless access point at the event location (424) is often a hub or central wireless access point for a telecommunications provider, as disclosed in the example embodiment of FIG. 4. The central wireless access point can also be a central wired access point and or any access point that places the network traffic on a reliable network that is utilized for communications such as a broadband network or a fiber network. The term reliable, as used in this embodiment and others does not mean the network does not fail, reliable means the network maintains consistent connection as is relied upon to do commerce transactions. Most networks, if not all, face congestion, load balancing, or other interruptions such as power, denial of service, loss of packets or otherwise, these events may all occur on both the reliable network and the unreliable network, the difference being that the unreliable intermittent network (422) is one in which the rate of such incidents are higher in proportion to the reliable network (426).

In the example embodiment of FIG. 4, the broadband network carrier (428) is a reliable network carrier. Examples of broadband network carriers (428) include Comcast®, AT&T®, Google Fiber®, Charter®, and many others as will be known by those of skill in the art. Financial verification servers (430) are often owned by payment processing organizations that run and verify credit checks. These companies work by application layers to the various credit lending institutions issuing the financial credit and communicate to verify the cardholder or customer (400) has available funds to make a purchase. Financial verification servers (430) in the example embodiment can belong to any number of providers and at times often multiple providers are utilized to verify the credit of the customer (400). FIG. 4 is but one example embodiment of the disclosure herein, additional embodiments such as reliable communications to the event (401) are disclosed herein.

Figure 5:
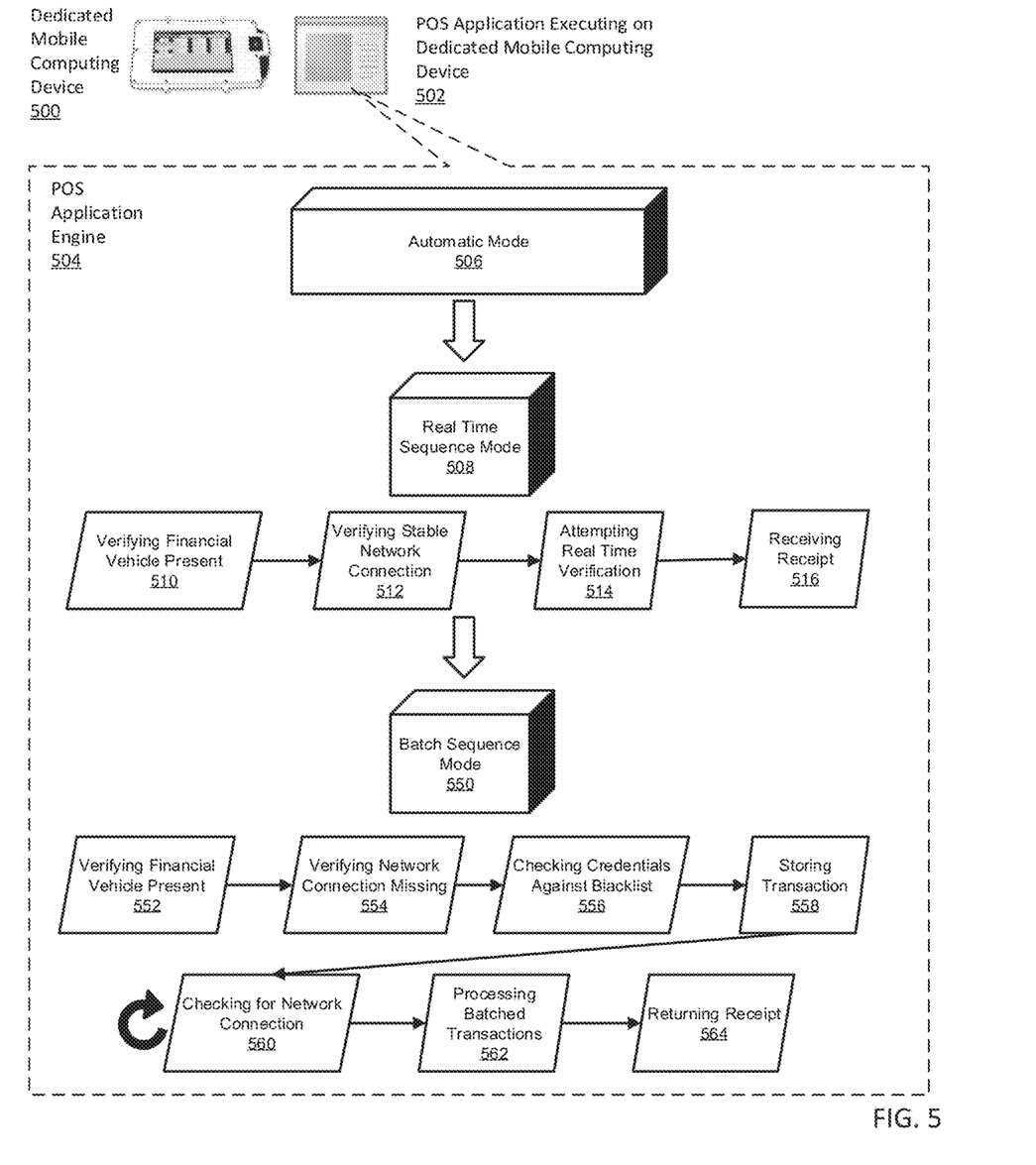
FIG. 5 sets forth a network diagram illustrating an example embodiment of the method flow for a POS system according to embodiments of the present invention.

FIG. 5 discloses further embodiments of the example systems, apparatuses, and methods disclosed herein. FIG. 5 is a block diagram and flow chart of an example embodiment for the POS application processing a credit transaction. In the example embodiment, the dedicated mobile computing device (500) executes the POS application (502) and displays the front end as a GUI for the user and customer. The POS application is equipped with a POS engine (504). The POS engine (504), among other things, processes the financial transactions by entering one of several modes. In the example embodiment three modes are listed—automatic mode (506), batch mode (550), and real-time sequence mode (508). Automatic mode in the example embodiment is the default mode for the POS application (502) and system, and operates to select between real-time sequence mode (508) and batch sequence mode (550). The choice between utilizing any of the three modes is dependent upon numerous factors including retail preference, vendor preference, network connectivity and many others. In the example embodiment automatic mode (506) prefers to utilize the real-time sequence mode (508) as the real-time sequence mode (508) attempts to verify credit instantaneously and requires network connections to be reliable throughout the communication pathways. The batch sequence mode (550) may be selected as default mode just as automatic mode (506) or real-time sequence mode (508). The batch sequence mode (550) batches transactions and provides a way to clear batched transactions upon network connection. Batch mode (550) provides in certain scenarios faster credit processing as it does not necessarily need network connection to batch transactions, thus, unlike automatic and real time modes, can operate without network connection. However, this is just but one example of batch mode (550). Often times batch mode (550) is utilized with a reliable network connection for vendors who prefer to process all transactions at once for any number of reasons including financial efficiency and lower processing fees.

Real-time sequence mode (508) operates by first verifying a financial vehicle is present (510) according to the example embodiment. After verifying the type of financial vehicle to process on, the real-time sequence mode (508) verifies the network connection is stable (512) for a real-time request. If the network connection is stable, the real-time sequence mode (508) attempts a real-time transaction by attempting connection to a transaction server or other financial server. In the example embodiment, the real-time transaction progresses as though the network was reliable, and no lost transactions or errors otherwise occurred. In additional embodiments real-time sequence mode (508) may fail and attempt another real-time sequence mode with a different transaction server, or further, the real-time sequence mode may be placed on a delay before attempting to retry the transaction. Numerous other variations of the present embodiment are disclosed herein and will be known by those of skill in the art.

In the example embodiment of FIG. 5, batch sequence mode (550) first verifies that a financial vehicle is present (552), such as a credit card, digital wallet, or e-card. After verifying the credit card is present, batch mode (550) verifies the network connection is missing (554), batch mode (550) may also be set to default that the network connection is already known to not exist. Following the check that the connection to the network is no longer established, or is established but batch mode is selected, the POS engine through the batch mode sequence (550) checks the credit account credentials against the locally stored blacklist repository (556). If the credit account is in the local stored blacklist repository, the batch mode sequence (550) will take action accordingly to parameters set for known bad lines of credit. The checking of the blacklist of credit is just one embodiment disclosed herein, in additional embodiments the step may be omitted all together and the batch mode progress to storing the transaction (558). Batch sequence mode (550) then stores the transaction (558) locally and if configured to batch upon network reconnection (560), attempts to process the batched transactions (562). Upon processing the batched transactions (562) in the example embodiment, the batch sequence mode returns the receipt (564) of the sale and reconciles sales receipts thereof. The example above of the batch sequence mode in FIG. 5 is but one example of a batch sequence for credit processing by the dedicated CRM and POS system, many other batch configurations may be attempted and are disclosed herein.

Figure 6:
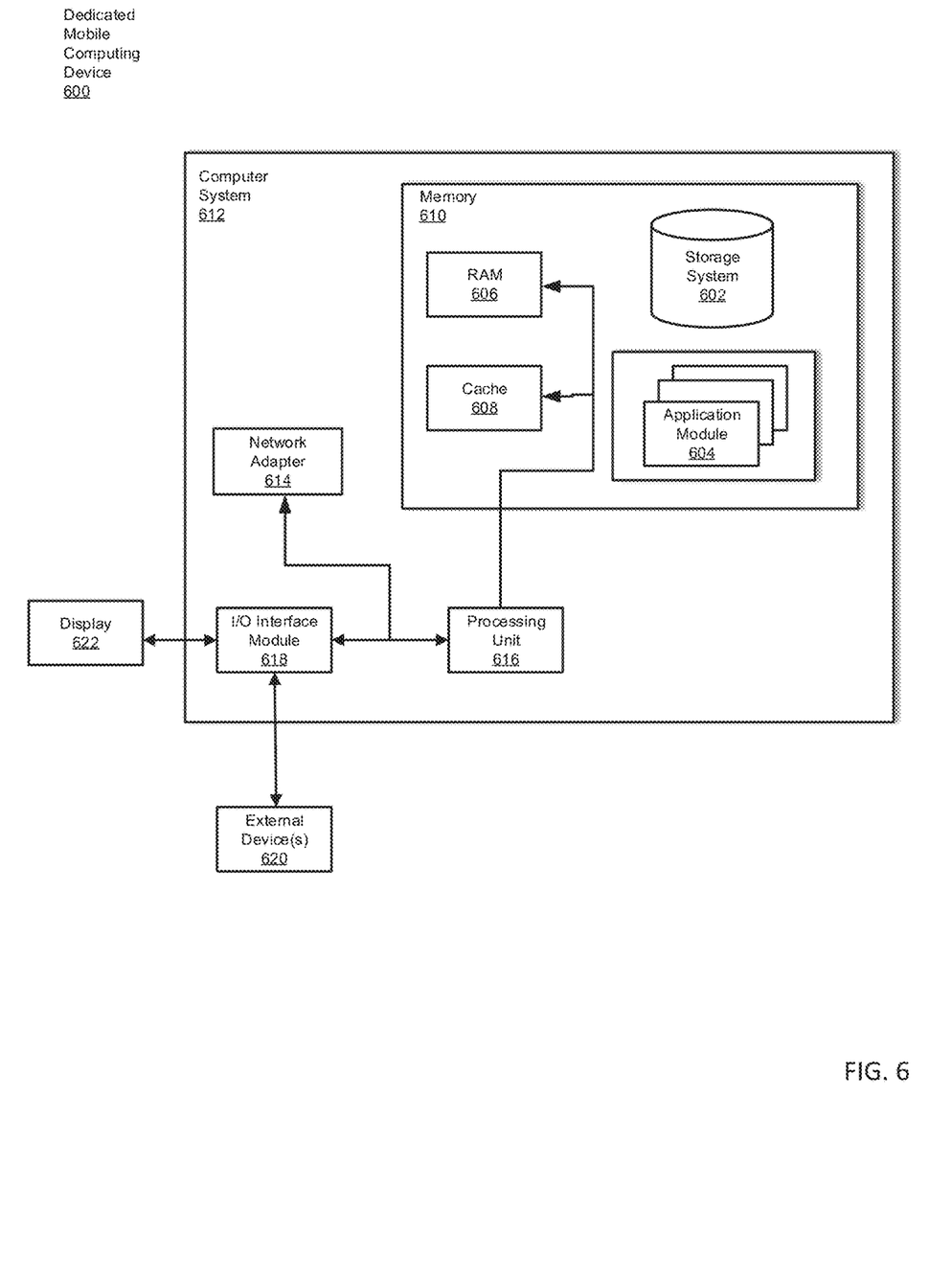
FIG. 6 sets for a block diagram illustrating the components of the hardware according to embodiments of the present invention.

Further example embodiments of the present invention can be described in FIG. 6, wherein FIG. 6 is a block diagram showing internal components of the dedicated mobile computing device (600). The dedicated mobile computing device (600) can also be described as a special purpose computing device.

In the example embodiment of FIG. 6, the computer system (612) of the dedicated mobile computing device (600) is comprised of several components. The computer system (612) contains a storage system (602) that is comprised of solid-state drive technology or may also be equipped with other hard drive technologies for storage of computing information. The POS application may reside long term on the storage system (602). The memory (610) of the example embodiment computing system (612) also contains Random Access Memory ('RAM') (610) which holds the program instructions along with a cache (608) for buffering the flow of instruction to the processing unit (616). Often times the executed POS application module (604) will reside in RAM (610) as instructions are executed by the processing unit (616).

In the example embodiments of FIG. 6, the processing unit travels through a bus to the network adapter (614) that facilitates communications via network cards, wireless, Bluetooth®, and local area network adapters. The processing unit (616) is further configured through a bus to the input output interface module ('IO') (618), the IO module is connected to the display (622) which displays the GUI of the POS application. The IO module (618) is further configured to interface with many other external devices (620) such as universal serial bus adapters, lightning ports, power ports, and a whole host of additional IO devices that are traditionally found interfacing with a general-purpose and or special purpose computing device. FIG. 6 is but one example embodiment of the configured dedicated mobile computing device (600) additional configurations and components of a general-purpose and special purpose computing device are disclosed herein.

Figure 7:
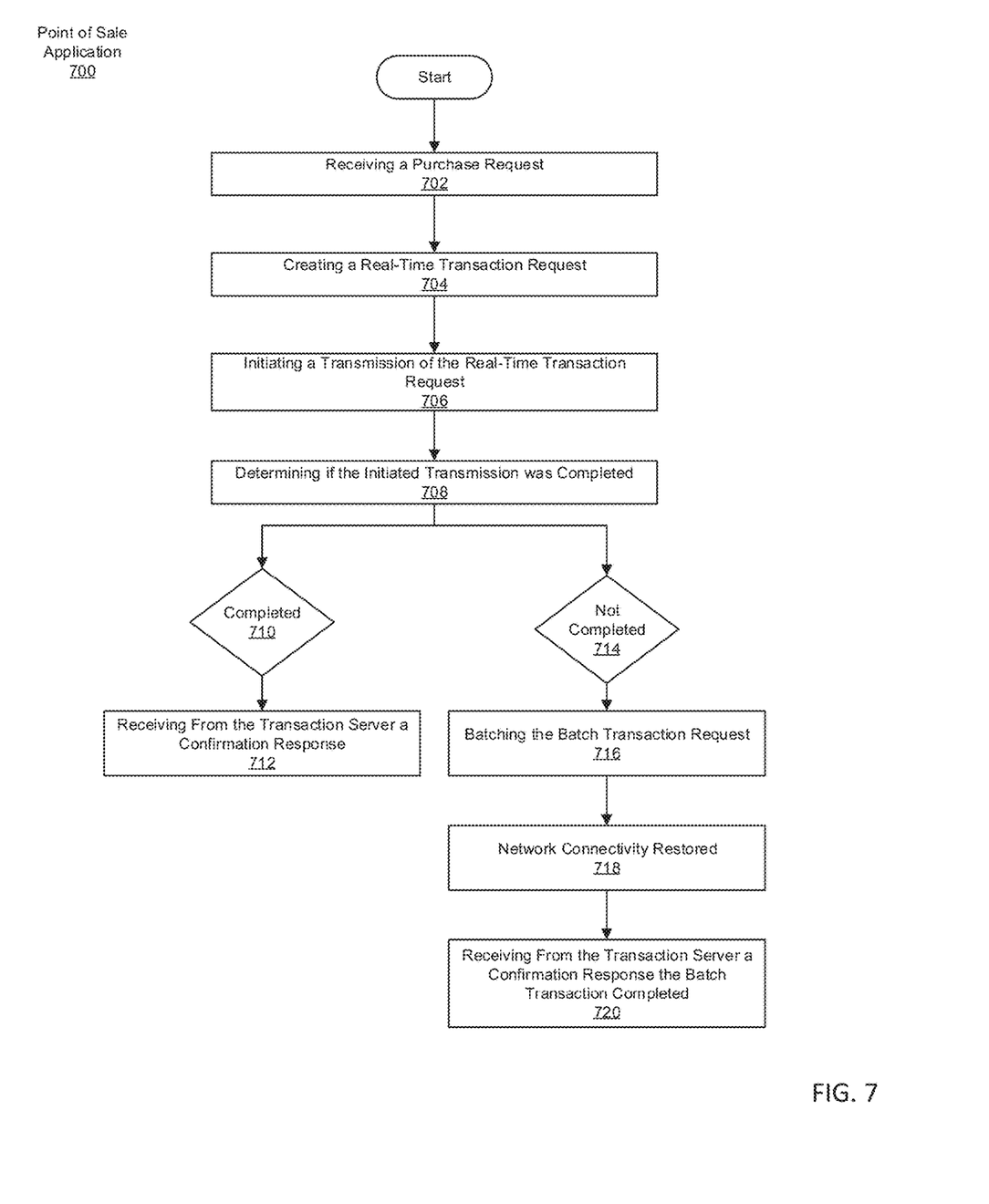
FIG. 7 sets forth a flow chart of a method for the POS system according to embodiments of the present invention.

FIG. 7 sets forth further explanation of the systems, there apparatuses, and methods as disclosed herein. FIG. 7 is a flowchart diagram depicting an example embodiment of a POS application (700). In the example embodiment of FIG. 7, the POS application (700) begins executing the POS engine by receiving a purchase request (702). The purchase request typically originates from the consumer or purchaser at the vendors location with the dedicated mobile computing device. The POS application executing on the dedicated mobile computing device receives the purchase request (702) and creates a real-time transaction request (704). The real-time transaction request (704) initiates a transmission of the contents of the real-time request (706) to the transaction server. The mobile computing device then awaits response to determine if the initiated real-time transaction request (708) was completed.

According to the example embodiment of FIG. 7, if the transmission is completed (710), the mobile computing device receives, via the point of sale application (700) a confirmation response from the transaction server (712) indicating that the transaction was verified and confirmation thereof.

According to the example embodiment of FIG. 7, if the transmission is not completed (714), the batch module batches the transaction request (716) and awaits network connectivity (718). In additional embodiments the batch request waits for a set period of time, in others it continually checks network connection status and processes the batched transaction upon restoration of network connection. Once network connectivity is restored the batched transaction is processed an awaits a confirmation receipt from the transaction server that the batch request was completed (720). Additional embodiments include the POS application switching from real-time mode and batch mode under the control of automatic mode, wherein the automatic mode controls the behavior and workflow of the real-time mode and batch mode. The sample workflow is one of many example embodiments of the present invention, many other workflows exist and can be alternatively replicated utilizing the same general disclosure herein.

Figure 8:
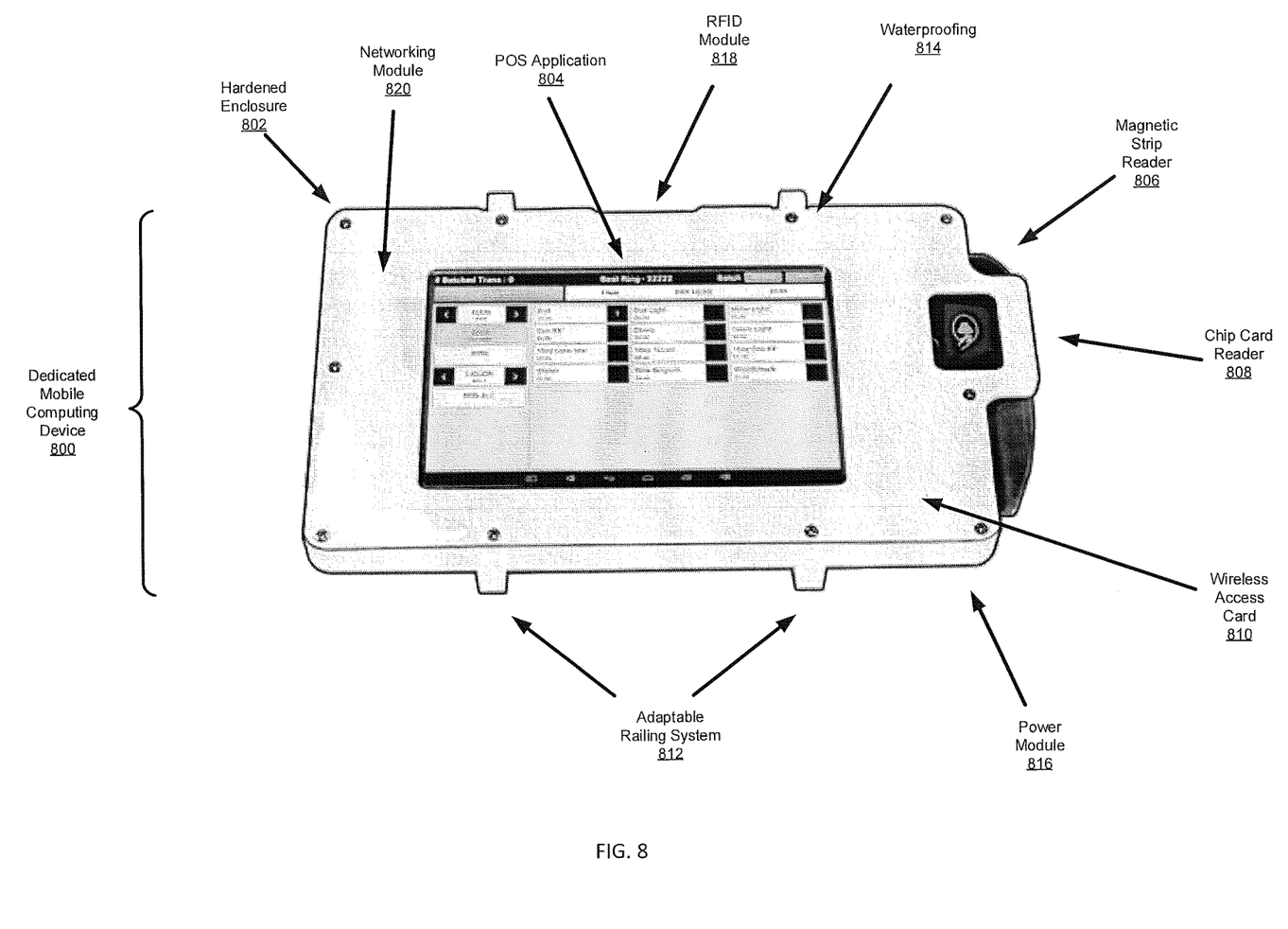
FIG. 8 sets forth a pictorial diagram of the dedicated mobile computing device according to embodiments of the present invention.

FIG. 8 sets forth an example embodiment of the invention as a pictorial diagram of a dedicated mobile computing apparatus and system therein. The overall embodiment in FIG. 8 operates to improve the mobile computing devices utilized at event locations to enhance the ability to processes POS transactions. In FIG. 8, the dedicated mobile computing device (800) is encased by a hardened enclosure (802). The hardened enclosure (802) in the present embodiment is made of a plastic resin and is secured with a rubber seal contiguous to the dedicated mobile computing device (800). The hardened enclosure maintains waterproofing (814) and serves to protect the dedicated mobile computing device from known hazards at events and when in transit. The hardened enclosure (802) further supports shock absorption as the plastic resin absorbs impacts. The hardened enclosure (802) supports dustproofing, and in this example embodiment, is configured with baffles to allow air flow out of the dedicated mobile computing device (800) but prevent dust and water from entering. Additional configurations such as a completely encased hardened enclosure for even more extreme event conditions is further disclosed in additional embodiments.

In the example embodiment of FIG. 8, the dedicated mobile computing device (800) is a Google® Tablet running Android® operating system. The tablet is encased in a hardened enclosure (802) to secure the device from event environments. The tablet is further equipped with special purpose hardware, including a magnetic strip reader (806), a chip card reader (808), a RFID module (818), and a power module (816). Additional embodiments of a dedicated mobile computing device include an Apple iPad®, Amazon Fire®, or other manufacturer of tablet computers. Further additional embodiments of a dedicated mobile computing device include mobile phones such as Apple iPhone®, Google Nexus®, and other such mobile phones that are equipped with the components of FIG. 8.

The dedicated mobile computing device (800) in FIG. 8, has program instructions installed and executing a POS application (804). The dedicated mobile computing device (800) is equipped with general-purpose computing equipment as well as additional special-purpose computing equipment. The POS application (804) has a GUI layer displayed wherein the vendor and the customer can interact with the dedicated mobile computing device (800). The POS application (804) is configured with the I/O of the dedicated mobile computing device (800) and accepts additional modules and functionality as disclosed herein.

The dedicated mobile computing device (800) configured with adaptable railing system (812), the adaptable railing system (812) configured for various positioning to allow for both the vendor and the customer to have accesses to the display through a tilt or a slide of the adaptable railing system (812). The adaptable railing system (812), in the example embodiment, is further configured for security purposes and to securely attach the dedicated mobile computing device (800) to a structure.

The dedicated mobile computing device (800) is equipped with several modules to accept a payment vehicle. An RFID module (818) accepts radio frequency ID accounts, including near field communications for payment. RFID modules are utilized to receive information from cashless wristbands and other RFID equipped products that facilitate cashless transactions. RFID tags contain an antenna and a memory chip to store data on the tag itself. The RFID tags are often found embedded into retail products and inventory packaging. Typical vendors of cashless RFID tags and wristbands include Intellitix®, Cvent®, Boomset®, and many others. The dedicated mobile computing device (800) is also configured through the I/O to a magnetic strip card reader (806), a chip card reader (808), and a wireless access card module (810). In the example embodiment of FIG. 8, the magnetic strip reader (806) communicates through a serial bus to the dedicated mobile computing device (800), wherein the POS application (804) processes the transaction. The chip reader (808) is equipped to receive EMV payment methods, EMV cards are smart cards or chip cards that store data on an integrated circuit in addition to also having a magnetic strip. EMV cards must be physically dipped or inserted into a reader, similar to contactless cards utilizing near field communication. EMV standards often utilize a chip and PIN methodology and sometimes a chip and signature depending upon the authentication required by the issuing financial institution. The benefits of EMV or chip cards and the chip card reader in the example embodiment include improved security and the ability for improved offline control of credit cards. The use of a PIN and cryptographic algorithms such as Triple DES, RSA, and SHA provide authentication of the card to the processing terminal and the card's issuing financial institution, thus improving the security of the transaction.

The dedicated mobile computing device (800) of FIG. 8, includes a wireless access card (810) such as an authentication card to unlock the dedicated mobile computing device (800). Access control cards are often utilized for rapid unlocking and require a carrier of a wireless card to do such. The improvement of the wireless access card allows for rapid accesses to the dedicated mobile computing device (800) in scenarios when accesses is stressed such as high-volume events and or conditions that would make entering lengthy passwords difficult. The wireless access card also removes the need for additional security features and customized applications of security passwords to provide a simple and clean interaction for the vendor.

In the example embodiment of FIG. 8, the dedicated computing device (800) includes a networking module (820). The networking module (820) is an enhancement that allows for networked communications across a range of standards. The networking module (820) is adaptable and can be upgraded through software as well as hardware and allows for network communications cross the reliable and unreliable networks.

In the example embodiment of FIG. 8, the dedicated computing device (800) is equipped with I/O and a power input that is customized as a power module (816) and built within the hardened enclosure (802). In the example embodiment of FIG. 8, the power module (816) is a CUI® non-isolated switching regulator of the series V78-2000 that is utilized to provide consistent amperage output on a circuit with varying levels of voltage. The power module (816) features high efficiency regulation with short circuit protection and operating conditions in a wide thermal range. The customized power module (816) further allows for rapid charging, among other useful features such as extra power storage as a built-in battery, and control of power modulation to serve as protection from such things as power surges that are known to frequently occur at events. The power module (816) is also equipped with an enlarged battery reservoir attached thereto and adapted into the hardened enclosure (802) to provide extended operation of the dedicated mobile computing device (802) when electrical power becomes disconnected.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose dedicated computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose dedicated hardware-based systems that perform the specified functions or acts or carry out combinations of special purpose hardware and computer instructions.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for Point of Sale ('POS') transaction processing for networked computing devices, comprising:
    a dedicated mobile computing device, wherein the dedicated mobile computing device is equipped with a processor, memory, and a network adapter;
    a magnetic strip card reader, wherein the magnetic strip card reader is configured to the dedicated mobile computing device;
    a chip card reader, wherein the chip card reader is configured to the dedicated mobile computing device; and
    a customer relationship management application configured to be held in the memory of the dedicated mobile computing device, the customer relationship management application comprising:
    a dynamic point of sale engine, wherein the dynamic point of sale engine is equipped to dynamically switch from a real-time financial transaction to a batch financial transaction in dependence on operating parameters; wherein the operating parameters include at least one operating parameter based on network connectivity.

2. The system of claim 1, wherein the point of sale engine is configured with hard drive storage for storing database tables for verifying payment clearance when network connection fails.

3. The system of claim 1, further comprising a RFID module.

4. The system of claim 1, wherein the dedicated computing device is equipped to communicate with plug and play credit payment processing hardware.

5. The system of claim 1, further comprising a Local Area Network ('LAN'), wherein the LAN is established at the event environment to communicate with a plurality of dedicated mobile computing devices equipped with the customer relationship management application.

6. A method for Point of Sale ('POS') transaction processing at an event environment, comprising:
    initiating, by a point of sale engine, automatic transaction mode; wherein the automatic transaction mode is equipped to receive a credit transaction;
    receiving, by the point of sale engine, a chip card transaction;
    determining, by the point of sale engine, network connectivity to a financial institution;
    initiating, by the point of sale engine, based on the chip card transaction and no network connectivity to the financial institution a batch transaction;
    processing, by the point of sale engine, the batch transaction for a clearance request; wherein processing the batch transaction establishes connection to a local event environment server for the clearance request;
    transmitting, by the point of sale engine, a batch transaction clearance request to the local event environment server;
    receiving, by the point of sale engine, creditworthiness based on a repository of credit information on the local event environment server; and
    processing, the point of sale engine, the chip card transaction; wherein processing places the swipe credit card transaction in a list for batch processing on network restoration.

7. The method of claim 6 further comprising, initiating, by the point of sale engine, based on the chip card transaction and network connectivity to the financial institution a real-transaction.

8. The method of claim 6 further comprising, transmitting, by the point of sale engine, a real-time transaction request to the financial institution.

9. The method of claim 6 further comprising, receiving, by the point of sale engine, confirmation of credit of the chip card transaction from the financial institution.

10. The method of claim 6 further comprising, processing, by the point of sale engine, the chip card transaction; wherein processing receives funds from a chip card holder.

11. The method of claim 6 further comprising, issuing, by the point of sale engine, a receipt for the chip card transaction.

12. A method for Point of Sale ('POS') transaction processing at an event environment, comprising:
    initiating, by a point of sale engine, automatic transaction mode; wherein the automatic transaction mode is equipped to receive a credit transaction;
    receiving, by the point of sale engine, a swipe credit card transaction;
    determining, by the point of sale engine, network connectivity to a financial institution;
    initiating, by the point of sale engine, based on the swipe credit card transaction and no network connectivity to the financial institution a batch transaction;
    processing, by the point of sale engine, the batch transaction for a clearance request; wherein processing the batch transaction establishes connection to a local event environment server for the clearance request;
    transmitting, by the point of sale engine, the batch transaction clearance request to the local event environment server;
    receiving, by the point of sale engine, creditworthiness based on the repository of credit information on the local event environment server; and
    processing, by the point of sale engine, the swipe credit card transaction; wherein processing places the swipe credit card transaction in a list for batch processing on network restoration.

13. The method of claim 12 further comprising, initiating, by the point of sale engine, based on the swipe credit card transaction and network connectivity to the financial institution a real-time transaction.

14. The method of claim 12 further comprising, transmitting, by the point of sale engine, a real-time transaction request to the financial institution.

15. The method of claim 12 further comprising, receiving, by the point of sale engine, confirmation of credit of the swipe credit card transaction from the financial institution.

16. The method of claim 12 further comprising, processing, by the point of sale engine, the swipe card transaction; wherein processing receives funds from a swipe card holder.

17. The method of claim 12 further comprising, issuing, by the point of sale engine, a receipt for the swipe credit card transaction.

\* \* \* \* \*